(12) United States Patent
Chung et al.

(10) Patent No.: US 10,810,169 B1
(45) Date of Patent: Oct. 20, 2020

(54) HYBRID FILE SYSTEM ARCHITECTURE, FILE STORAGE, DYNAMIC MIGRATION, AND APPLICATION THEREOF

(71) Applicant: Research Institute of Tsinghua University in Shenzhen, Shenzhen (CN)

(72) Inventors: Yeh-Ching Chung, Shenzhen (CN); Lidong Zhang, Shenzhen (CN); Yongwei Wu, Beijing (CN)

(73) Assignee: Research Institute of Tsinghua University in Shenzhen, Shenzhen (CN)

( * ) Notice: Subject to any disclaimer, the term of this patent is extended or adjusted under 35 U.S.C. 154(b) by 0 days.

(21) Appl. No.: 16/831,964

(22) Filed: Mar. 27, 2020

Related U.S. Application Data

(63) Continuation of application No. PCT/CN2017/103907, filed on Sep. 28, 2017.

(51) Int. Cl.
  *G06F 16/182* (2019.01)
  *G06N 20/00* (2019.01)
  (Continued)

(52) U.S. Cl.
  CPC .......... *G06F 16/183* (2019.01); *G06F 16/119* (2019.01); *G06F 16/148* (2019.01); *G06N 20/00* (2019.01)

(58) Field of Classification Search
  CPC .... G06F 16/119; G06F 16/143; G06F 16/182; G06F 16/183; G06N 20/00
  See application file for complete search history.

(56) References Cited

U.S. PATENT DOCUMENTS

| | | | | |
|---|---|---|---|---|
| 7,107,323 B2* | 9/2006 | Hara | ...................... | G06F 16/122 709/218 |
| 7,730,071 B2* | 6/2010 | Iwasaki | ................. | G06F 16/119 707/742 |

(Continued)

FOREIGN PATENT DOCUMENTS

| | | |
|---|---|---|
| CN | 102456049 A | 5/2012 |
| CN | 103593347 A | 2/2014 |

(Continued)

OTHER PUBLICATIONS

Wang et al. Storage device performance prediction with CART models. Proceedings of the IEEE Computer Society's 12th Annual International Symposium on Modeling, Analysis, and Simulation of Computer and Telecommunications Systems, 2004. pp. 588-595, doi: 10.1109/MASCOT.2004.1348316 (Year: 2004).*

(Continued)

*Primary Examiner* — James E Richardson
(74) *Attorney, Agent, or Firm* — IPro, PLLC

(57) ABSTRACT

Provided are a hybrid distributed file system architecture structure, an applied file storage processing method, a dynamic migration method, and application thereof. The file storage processing method comprises: acquiring storage attributes of a file to be stored, wherein the storage attributes at least include a size of the file; determining, according to a pre-configured storage rule and the attributes of the file to be stored, in which distributed file system the file to be stored is stored; and storing the file to be stored in the determined distributed file system. The method further comprises migrating, according to a predetermined policy, a file that has been stored in a predetermined storage location. The device intelligently selects a file underlying storage policy according to file feature attributes to decide whether to migrate the file and to which file system the file is migrated so as to satisfy usage equalization of different file systems (Continued)

and also minimize performance degradation. By means of experimental comparison, it is concluded that the present disclosure can greatly improve comprehensive file performances such as I/O performance and the usage equalization of the file system.

14 Claims, 7 Drawing Sheets

(51) Int. Cl.
*G06F 16/14* (2019.01)
*G06F 16/11* (2019.01)

(56) References Cited

U.S. PATENT DOCUMENTS

| | | | | |
|---|---|---|---|---|
| 8,135,763 | B1* | 3/2012 | Compton | G06F 16/122 707/822 |
| 2002/0073354 | A1* | 6/2002 | Schroiff | G06F 11/2023 714/4.11 |
| 2007/0022129 | A1* | 1/2007 | Bahar | H04L 67/1095 |
| 2007/0088717 | A1* | 4/2007 | Chen | G06F 16/35 |
| 2009/0150639 | A1* | 6/2009 | Ohata | G06F 3/0665 711/172 |
| 2016/0291877 | A1* | 10/2016 | Higuchi | G06F 3/0641 |

FOREIGN PATENT DOCUMENTS

| | | | |
|---|---|---|---|
| CN | 103778222 A | * | 5/2014 |
| CN | 103778222 A | | 5/2014 |
| CN | 104994171 A | | 10/2015 |

OTHER PUBLICATIONS

Kraft et al. Performance models of storage contention in cloud environments. Softw Syst Model 12, 681-704 (2013). https://doi.org/10.1007/s10270-012-0227-2 (Year: 2012).*

Zhang et al. HybridFS—A High Performance and Balanced File System Framework with Multiple Distributed File Systems. 2017 IEEE 41st Annual Computer Software and Applications Conference (COMPSAC). Turin. 2017. pp. 796-805. doi: 10.1109/COMPSAC.2017.140 (Year: 2017).*

* cited by examiner

HYBRID FILE SYSTEM ARCHITECTURE, FILE STORAGE, DYNAMIC MIGRATION, AND APPLICATION THEREOF

TECHNICAL FIELD

The present disclosure relates to a technical field of distributed file systems, and more particularly, to a hybrid file system architecture having a plurality of distributed file systems hybridized therein, file storage, dynamic migration, and application thereof.

BACKGROUND

In the research field of distributed file systems, with respect to different fields and application scenarios, different research institutes as well as enterprises and institutions may design distributed file systems of different architectures to meet specific needs, for example, the Taobao File System (TFS) meets users' storage needs while meeting Taobao's massive picture storage optimization, HDFS is mainly applied to distributed computing and has good processing performance for large data streams, Glusterfs adopts a non-metadata server idea to optimize small file storage and operations involving large amounts of metadata, FaceBook has mainly improved HDFS according to a size range of stored files and content requirements, Ceph is committed to proposing a highly available distributed file system and designing a plurality of metadata servers to improve metadata performance. In view of the different design objectives of the above-described different file systems, universality of the file systems is relatively poor. For example, HDFS has high read and write performance with respect to large files. Experimental analysis shows that it has better read and write performance when files are larger than 8M; while Glusterfs has better I\O performance with respect to files smaller than 8M; and so on.

In the prior art, there is no related solution for how to use different file systems for storage to improve storage efficiency.

SUMMARY

One of the technical problems to be solved by the present disclosure is: in a case where a variety of high-performance file systems coexist, how to make full use of performance advantages of various file systems, integrate a variety of file systems, make full use of their respective advantages, improve storage efficiency, improve overall performance, and comprehensively process various situations to achieve optimal overall performance of the file systems.

In this regard, the present disclosure is proposed.

According to one aspect of the present disclosure, there is provided a file storage processing method applied in a hybrid file system architecture including a plurality of different types of distributed file systems, for determining in which distributed file system a file to be stored is stored, the file storage processing method comprising: acquiring storage attributes of the file to be stored, wherein, the storage attributes at least include a size of the file; determining, according to a pre-configured storage rule and the attributes of the file to be stored, in which distributed file system the file to be stored is stored; and storing the file to be stored in the determined distributed file system.

Optionally, the storage rule is an intelligent storage model obtained through learning by using an artificial intelligence learning algorithm based on a training sample set; and features of each training sample of the training sample set include the storage attributes of the file and a label of the file system to which the file has been determined to be assigned.

Optionally, the storage attributes of the file further include: access mode type, access permission level, and associated users of the file, wherein, the access mode type is selected from one of: read-only, write-only, read-write, and executable.

Optionally, the hybrid file system architecture includes a metadata manage server, wherein, the storage rule is stored in a non-volatile storage medium, and meanwhile maintained in a metadata manage server memory; and the storage rule is dynamically updated, wherein, the determining, according to a pre-configured storage rule and the attributes of the file to be stored, in which distributed file system the file to be stored is stored includes: reading the storage rule from the metadata manage server, and determining, according the read storage rule and the attributes of the file to be stored, in which distributed file system the file to be stored is stored.

Optionally, the storage rule is further maintained in a remote standby node.

Optionally, the artificial intelligence learning algorithm is a decision tree, and the intelligent storage model is a decision tree model constructed based on training data.

Optionally, optimization processing including pruning and cross-validation is performed in construction of the decision tree model.

Optionally, the file storage processing method further comprises: receiving, by the metadata manage server, from a client a request to read a file from the hybrid file system architecture or update a file therein; acquiring, by the metadata manage server, path information of the file to be read or updated, to further obtain storage location information of the file; returning, by the metadata manage server, the storage location of the file to be read or updated to the client; and communicating, by the client, with a corresponding distributed file system according to the returned storage location, to perform actual read operation or update operation.

Optionally, I/O performance of the file on each of the distributed file systems is determined experimentally as follows: acquiring a read throughput rate $F_{irt}$ and a write throughput rate $F_{iwt}$ of the file on each distributed file system through experiments, the read throughput rate $F_{irt}$ being a data size of the file read per second, and the write throughput rate $F_{iwt}$ being a data size of the file written per second; and calculating a sum of the read throughput rate $F_{irt}$, and the write throughput rate $F_{iwt}$ of the file in each distributed file system as the I/O performance of the file on each of the distributed file systems.

Optionally, the file storage processing method further comprises: determining a distributed file system that needs file migration; determining a file to be migrated on the distributed file system and a migration destination, for the distributed file system that needs file migration; and migrating the file that has been determined to be migrated.

Optionally, the determining a distributed file system that needs file migration includes: calculating a difference in usage rate between any two distributed file systems; and determining that a distributed file system with a higher usage rate needs file migration, when the difference in usage rate is greater than a predetermined threshold.

Optionally, the determining a file to be migrated on the distributed file system, for the distributed file system that needs file migration includes: calculating a migration gain of migrating each file in the distributed file system that needs file migration to any one of other distributed file systems; and determining the file to be migrated and the migration destination of the file based on sorting of migration gains of migrating respective files to other distributed file systems.

Optionally, the calculating a migration gain of migrating each file in the distributed file system that needs file migration to any one of other distributed file systems includes: referring to the distributed file system that needs file migration as a distributed file system i, referring to any one of the other distributed file systems as a distributed file system j, and referring to the file on the distributed file system i as a file x; obtaining read throughput and write throughput of the file x on the distributed file system i, and predicting read throughput and write throughput of the file x on the distributed file system j; obtaining a read frequency and a write frequency of the file x on the distributed file system i; and calculating a migration gain of migrating the file x from the distributed file system i to the distributed file system j, at least based on the size of the file x, the read frequency and the write frequency of the file x on the distributed file system i, the read throughput and the write throughput of the file x on the distributed file system i, as well as the read throughput and the write throughput of the file x on the distributed file system j.

Optionally, the migration gain of migrating the file x from the distributed file system i to the distributed file system j is calculated based on a formula below:

$$\text{diff}_x(DFS_i,DFS_j)=(s_x/F_{xrt}(DFS_i)-s_x/F_{xrt}(DFS_j))*F_{xrf}+ \\ (s_x/F_{xwt}(DFS_i)-s_x/F_{xwt}(DFS_j))*F_{xwf} \quad (1)$$

$DFS_i$ and $DFS_j$ represent the distributed file systems i,j; $F_{xrt}(DFS_i)$ and $F_{xrt}(DFS_j)$ are respectively read throughput rates of the file x in the distributed file systems i,j; $F_{xwt}(DFS_i)$ and $F_{xwt}(DFS_j)$ are write throughput rates of the file x in the distributed file systems i,j; a throughput rate is a size of a file read and written per second; the read throughput rate and the write throughput rate are functions of the file size; $F_{xrf}$ and $F_{xwf}$ are respectively the read frequency and the write frequency of the file x in the distributed file system i; and $s_x$ is a size of the file x to be migrated in the file system.

Optionally, the predicting read throughput and write throughput of the file x on the distributed file system j includes: predicting by using a predetermined regression model, the regression model being selected from one of:

| Model | Regression equation |
|---|---|
| First-order model | $y(k) = a_0 + a_1 e^{-pk}$ |
| Second-order model | $y(k) = a_0 + a_1 e^{-pk} + a_2 e^{-p_2 k}$ |
| Third-order model | $y(k) = a_0 + a_1 e^{-pk}$ <br> $+ be^{-\delta wk}\cos(w\sqrt{1-\delta^2}\,k)$ <br> $+ ce^{-\delta wk}\sin(w\sqrt{1-\delta^2}\,k)$ |
| Fourth-order model | $y(k) = a_0 + b_1 e^{-\delta_1 w_1 k}\cos(w_1\sqrt{1-\delta_1^2}\,k)$ <br> $+ c_1 e^{-\delta_1 w_1 k}\sin(w_1\sqrt{1-\delta_1^2}\,k)$ <br> $+ b_2 e^{-\delta_2 w_2 k}\cos(w_2\sqrt{1-\delta_2^2}\,k)$ <br> $+ c_2 e^{-\delta_2 w_2 k}\sin(w_2\sqrt{1-\delta_2^2}\,k)$ |

The predetermined regression model is determined through a fitting process and a selecting process below: inputting file training data to different types of regression models; calculating unknown parameters by using a least square method; fitting to obtain the different types of regression models after the fitting; and selecting a regression model with a best fitting effect from the different types of regression models after the fitting as the predetermined regression model.

Optionally, the obtaining a read frequency and a write frequency of the file x on the distributed file system i includes: obtaining the read frequency and the write frequency of the file x on the distributed file system i by querying the metadata manage server.

According to another aspect of the present disclosure, there is provided a file dynamic migration method applied in a hybrid file system architecture including a plurality of different types of distributed file systems, comprising: determining a distributed file system that needs file migration; determining a file to be migrated on the distributed file system and a migration destination, for the distributed file system that needs file migration; and migrating the file that has been determined to be migrated.

Optionally, the determining a distributed file system that needs file migration includes: calculating a difference in usage rate between any two distributed file systems; and determining that a distributed file system with a higher usage rate needs file migration, when the difference in usage rate is greater than a predetermined threshold.

Optionally, the determining a file to be migrated on the distributed file system, for the distributed file system that needs file migration includes: calculating a migration gain of migrating each file in the distributed file system that needs file migration to any one of other distributed file systems; and determining the file to be migrated and the migration destination of the file based on sorting of migration gains of migrating respective files to other distributed file systems.

Optionally, the calculating a migration gain of migrating each file in the distributed file system that needs file migration to any one of other distributed file systems includes: referring to the distributed file system that needs file migration as a distributed file system i, referring to any one of the other distributed file systems as a distributed file system j, and referring to the file on the distributed file system i as a file x; obtaining read throughput and write throughput of the file x on the distributed file system i, and predicting read throughput and write throughput of the file x on the distributed file system j; obtaining a read frequency and a write frequency of the file x on the distributed file system i; and calculating a migration gain of migrating the file x from the distributed file system i to the distributed file system j, at least based on the size of the file x, the read frequency and the write frequency of the file x on the distributed file system i, the read throughput and the write throughput of the file x on the distributed file system i, as well as the read throughput and the write throughput of the file x on the distributed file system j.

Optionally, the migration gain of migrating the file x from the distributed file system i to the distributed file system j is calculated based on a formula below:

$$\text{diff}_x(DFS_i,DFS_j)=(s_x/F_{xrt}(DFS_i)-s_x/F_{xrt}(DFS_j))*F_{xrf}+ \\ (s_x/F_{xwt}(DFS_i)-s_x/F_{xwt}(DFS_j))*F_{xwf} \quad (1)$$

$DFS_i$ and $DFS_j$ represent the distributed file systems i,j; $F_{xrt}(DFS_i)$ and $F_{xrt}(DFS_j)$ are respectively read throughput rates of the file x in the distributed file systems i,j; $F_{xwt}(DFS_i)$ and $F_{xwt}(DFS_j)$ are write throughput rates of the file x in the distributed file systems i,j; a throughput rate is a size of a file read and written per second; the read throughput rate and the write throughput rate are functions of the file size;

$F_{xrf}$ and $F_{xwf}$ are respectively the read frequency and the write frequency of the file x in the distributed file system i; and $s_x$ is a size of the file x to be migrated in the file system.

Optionally, the predicting read throughput and write throughput of the file x on the distributed file system j includes:

Predicting by using a predetermined regression model, the regression model being selected from one of:

| Model | Regression equation |
|---|---|
| First-order model | $y(k) = a_0 + a_1 e^{-pk}$ |
| Second-order model | $y(k) = a_0 + a_1 e^{-pk} + a_2 e^{-p_2 k}$ |
| Third-order model | $y(k) = a_0 + a_1 e^{-pk}$ |
| | $\quad + be^{-\delta wk}\cos(w\sqrt{1-\delta^2}\,k)$ |
| | $\quad + ce^{-\delta wk}\sin(w\sqrt{1-\delta^2}\,k)$ |
| Fourth-order model | $y(k) = a_0 + b_1 e^{-\delta_1 w_1 k}\cos(w_1\sqrt{1-\delta_1^2}\,k)$ |
| | $\quad + c_1 e^{-\delta_1 w_1 k}\sin(w_1\sqrt{1-\delta_1^2}\,k)$ |
| | $\quad + b_2 e^{-\delta_2 w_2 k}\cos(w_2\sqrt{1-\delta_2^2}\,k)$ |
| | $\quad + c_2 e^{-\delta_2 w_2 k}\sin(w_2\sqrt{1-\delta_2^2}\,k)$ |

The predetermined regression model is determined through a fitting process below: inputting file training data to different regression models; calculating unknown parameters by using a least square method; and obtaining a curve with a best fitting effect as the predetermined regression model.

Optionally, the obtaining a read frequency and a write frequency of the file x on the distributed file system i includes: obtaining the read frequency and the write frequency of the file x on the distributed file system i by querying the metadata manage server.

According to another aspect of the present disclosure, there is provided a file storage processing device, comprising a memory and a processor, the memory having computer-executable instructions stored thereon, and when executed by a controller, the computer-executable instructions being operable to execute the above-described file storage processing method.

According to another aspect of the present disclosure, there is provided a file migration processing system, comprising a memory and a processor, the memory having computer-executable instructions stored thereon, and when executed by a controller, the computer-executable instructions being operable to execute the above-described file dynamic migration method.

According to another aspect of the present disclosure, there is provided a computer-readable storage medium, having computer-executable instructions stored thereon, and when executed by a computing device, the computer-executable instructions being operable to execute the above-described file storage processing method.

According to another aspect of the present disclosure, there is provided a computer-readable storage medium, having computer-executable instructions stored thereon, and when executed by a computing device, the computer-executable instructions being operable to execute the above-described file dynamic migration method.

According to another aspect of the present disclosure, there is provided a metadata manage server in a hybrid file system architecture system, which interacts with a client and a plurality of distributed file systems, the metadata manage server maintaining a pre-configured storage rule below, and being configured to perform a method below: acquiring storage attributes of a file to be stored, wherein, the storage attributes at least include a size of the file; determining, according to a pre-configured storage rule and the attributes of the file to be stored, in which distributed file system the file to be stored is stored; determining a distributed file system that needs file migration; determining a file to be migrated on the distributed file system and a migration destination, for the distributed file system that needs file migration; and migrating the file that has been determined to be migrated.

According to another aspect of the present disclosure, there is provided a hybrid file system architecture system, comprising a metadata manage server and a plurality of different types of distributed file systems.

The file intelligent storage policy according to the embodiment of the present disclosure is adopted to make full use of storage features of a variety of file systems, integrate a variety of file systems, and intelligently select the file underlying storage policy according to the file feature attributes, to optimize file read and write performances.

Preferably, the intelligent storage policy is the decision tree model; the training data is acquired through previous experiments, then the decision tree model is obtained by training, subsequently the stored file attributes are used as input of the decision tree model, and output thereof is just the file storage location, so as to make the file read and write characteristics the best.

Further, a file dynamic migration policy is adopted. Preferably, file system load equalization is used as an evaluation index of the file system, and it is decided whether to migrate the file and to which file system the file is migrated, according to storage space usage rates of different underlying file systems, read and write I/O of different files in different file systems, as well as different read and write frequencies of different files, so as to satisfy usage equalization of different file systems and also minimize performance degradation.

By means of experimental comparison, it is concluded that the present disclosure can greatly improve performances of different underlying files.

The high-performance hybrid file system architecture structure, the file storage processing method, the file dynamic migration method and the metadata manage server according to the embodiments of the present disclosure, make comprehensive use of the performance advantages of a variety of distributed file systems to process various file storage problems, which, committed to improving a universal high-performance file system, can cope with storage problems of files of various types under various complex environments, and all have high performance.

DETAILED DESCRIPTION

The following is to disclose the present disclosure so as to enable those skilled in the art to implement the present disclosure. Preferred embodiments as described below are merely exemplary, and those skilled in the art may conceive of other obvious modifications. Basic principles the present disclosure defined in the following description may be used in other embodiments, modifications, improvements, equivalents, and other technical solutions without departing from the spirit and the scope of the present disclosure.

The terms and words used in the following description and claims are not limited to literal meanings, but are merely used by the inventor to enable a clear and consistent understanding of the present disclosure. Accordingly, it should be apparent to those skilled in the art that the following description of various embodiments of the present disclosure is provided for illustration only, rather than limiting the present disclosure as defined by the appended claims and their equivalents.

The terminology used herein is for describing various embodiments only and is not intended to limit the same. As used herein, a singular form is intended to include a plural form as well, unless otherwise clearly indicated by the context. It will be further understood that the terms "including" and/or "having", as used in the specification, specify presence of features, numbers, steps, operations, components, items or combinations thereof as described, and do not exclude presence or addition of one or more features, numbers, steps, operations, components, items or combinations thereof.

The technical terms or scientific terms here should be of general meaning as understood by those ordinarily skilled in the art, as long as the terms are not defined differently. It should be understood that the terms defined in commonly used dictionaries have meanings that are consistent with the meanings of terms in the prior art.

Hereinafter, the present disclosure will be further described in detail in conjunction with the accompanying drawings and specific embodiments.

Figure 1:
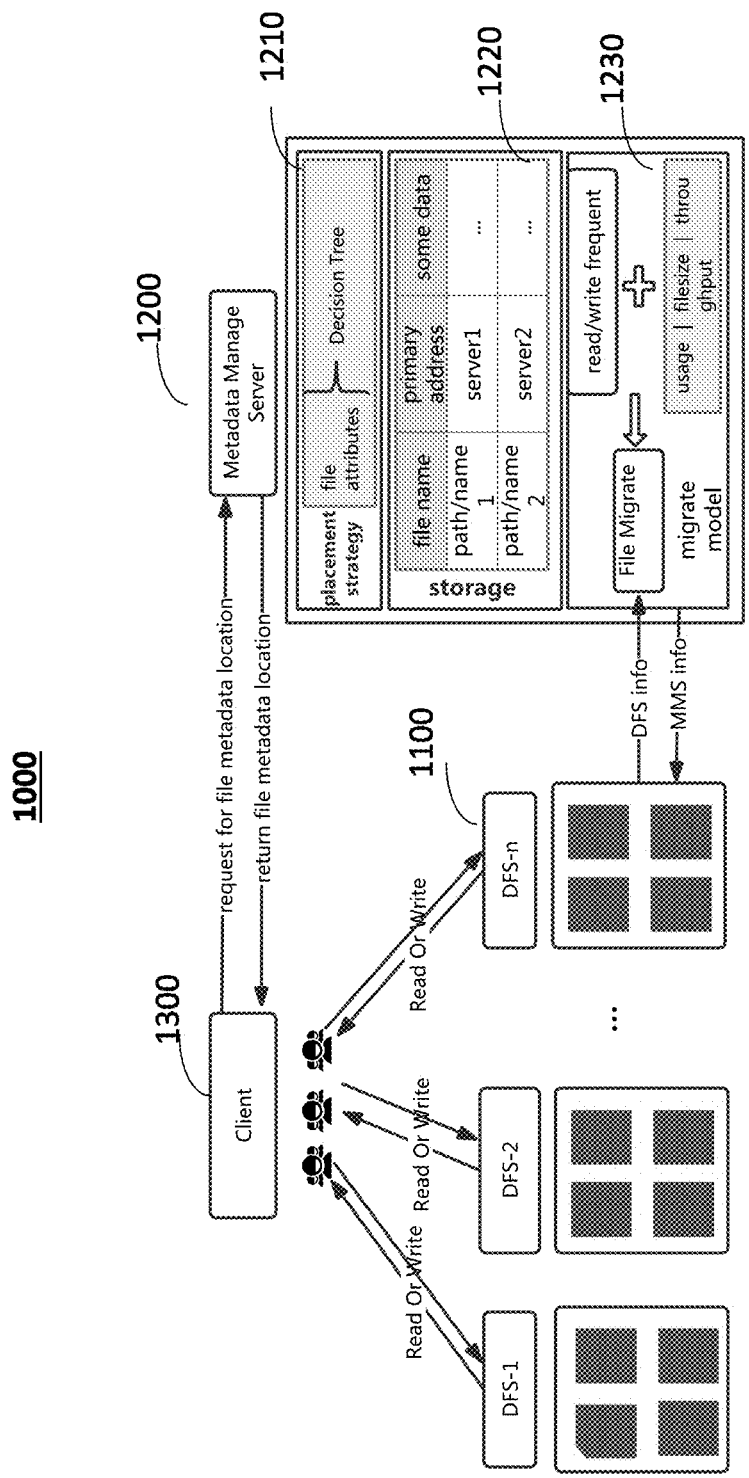
FIG. 1 shows a structural schematic diagram of a hybrid file system architecture according to an embodiment of the present disclosure.

FIG. 1 shows a structural schematic diagram of a hybrid file system architecture 1000 according to an embodiment of the present disclosure, mainly comprising three parts: an underlying storage system 1100, a metadata manage server 1200, and a client 1300. The diagram shows that the underlying storage system 1100 includes various types of distributed file systems DFS-1, DFS-2 . . . DFS-n, such as Ceph, HDFS, GlusterFs, etc., which are used to actually store data and are hidden from, or say, transparent to users, but the users do not know in which distributed file system the data they care about is stored; the client 1300 is for users to read and write data, and provides a variety of frequently-used file system universal interfaces; the metadata manage server 1200 is a core module of the hybrid file system architecture; according to one embodiment, the metadata manage server 1200 stores an intelligent storage decision policy 1210 and a dynamic migration policy 1230, and at a same time, may store a part of metadata 1220; the metadata manage server 1200, in response to the client's file write request, determines a file storage location according to the file intelligent storage decision policy 1210, and feeds back the same to the client; and the metadata manage server 1200 monitors usage situation of respective distributed file systems DFS-1, . . . , DFS-n, and performs file migration between distributed file systems according to the file dynamic migration policy when severe disequilibrium in usage rate occurs between file systems, so as to maintain relative equalization in usage rate between the hybrid distributed file systems.

Figure 2:
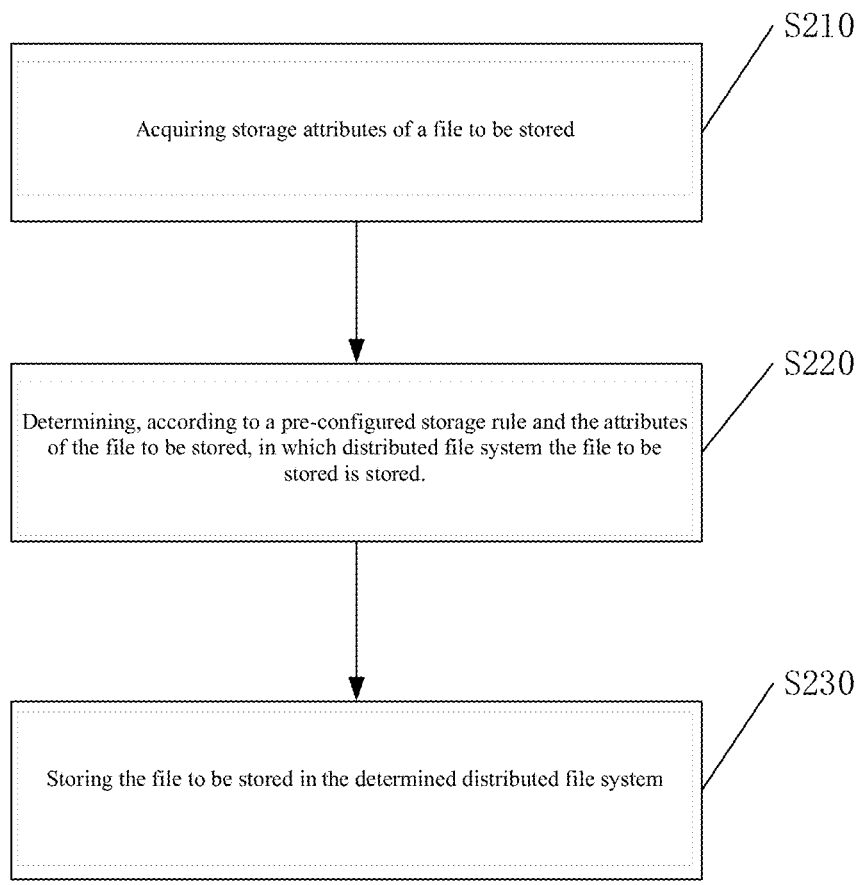
FIG. 2 shows a flow chart of an applied file storage processing method in a hybrid file system architecture according to an embodiment of the present disclosure.

FIG. 2 shows a flow chart of an applied file storage processing method 200 in a hybrid file system architecture according to an embodiment of the present disclosure.

As shown in FIG. 2, step S210: acquiring storage attributes of a file to be stored, wherein, the storage attributes at least include a size of the file.

In one example, the storage attributes of the file further include: access mode type, access permission level, and associated users of the file, wherein, the access mode type is selected from one of: read-only, write-only, read-write, and executable.

In one example, a metadata manage server obtains the storage attributes of the file to be stored from a client, stores and maintains the same as metadata in its own memory, as shown in FIG. 1.

Step S220: determining, according to a pre-configured storage rule and the attributes of the file to be stored, in which distributed file system the file to be stored is stored.

In one example, the storage rule is an intelligent storage model obtained through learning by using an artificial intelligence learning algorithm based on a training sample set; and features of each training sample of the training sample set include the storage attributes of the file and a label of the file system to which the file has been determined to be assigned.

In one example, the label of the file system to which the file has been determined to be assigned is determined based on experimentally determined I/O performance of the file on each of the distributed file systems, and the I/O performance includes a read throughput rate and/or a write throughput rate.

In one example, in consideration of problems of metadata server node failure and memory data loss, the storage rule, for example, may be stored in a non-volatile storage medium such as a hard disk while the decision tree model is maintained and stored in the memory. In another example, for more security reasons, the storage rule is simultaneously sent to a remote standby node.

In one example, the storage rule is dynamically updated, for example, according to a certain period; through learning by using the artificial intelligence learning algorithm again, a newly learned storage rule is updated to the metadata manage server; and the storage rule stored in the hard disk and/or the remote node is updated synchronously.

In one example, the determining, according to a pre-configured storage rule and the attributes of the file to be stored, in which distributed file system the file to be stored is stored includes: reading the storage rule from the metadata manage server, and determining, according the read storage rule and the attributes of the file to be stored, in which distributed file system the file to be stored is stored.

In one example, the artificial intelligence learning algorithm is a decision tree, and the intelligent storage model is a decision tree model constructed based on training data. Subsequently, an example of a process of constructing the decision tree model will be described in detail with reference to the drawings.

For example, in conjunction with the hybrid file system architecture of FIG. 1, the metadata manage server 1200 determines in which distributed file system the file is stored, by using the intelligent storage model 1210, based on the storage attributes of the file obtained from the client, and returns the same to the client 1300.

Step S230: storing the file to be stored in the determined distributed file system.

Specifically, for example, the client 1300 directly communicates with the distributed file system 1100, and the distributed file system stores the file in the determined specific distributed file system.

By using the file storage processing method according to the embodiment of the present disclosure, the specific distributed file system is selected according to the attributes of the file based on the predetermined storage rule, so as to, for example, improve storage performance and efficiency, and solve the technical problem of how to use different file systems for storage to improve storage efficiency. In order to improve universality of the file systems, a variety of distributed file systems are integrated, and system performance is comprehensively improved, by acquiring performance characteristics of various types of distributed file systems for various files through, for example, machine learning in advance, and by comprehensively utilizing advantages of different distributed file systems in a file access process. Specifically, for example, for different distributed file systems, processing attributes of files with different attributes when stored on these distributed file systems are obtained in advance, for example, I/O performances of files of different sizes on different distributed file systems may be obtained; rules may be established according to the knowledge obtained in advance; and these rules are used when a file is stored subsequently.

Hereinafter, the construction method of the decision tree model will be described in conjunction with one embodiment.

Before the construction method of the decision tree model is described, it is firstly explained how to obtain the training sample dataset.

In one example, file of different sizes are selected as experimental data, tested and assessed in a variety of distributed file systems, to acquire a read throughput rate and a write throughput rate $F_{irt}$, $F_{iwt}$ of different files indifferent distributed file systems; and then one with a maximum result is selected as a training data label according a formula below.

$$dfs=\max(F_{irt}+F_{iwt}), i=1,2 \ldots ,m (m \text{ file systems})$$

In a specific embodiment, the storage attributes of the file are extracted, including file size, access mode, access permission, and owner; a training data label of each file determined through the above-described experiment is obtained; and data shown in Table 1 is acquired as the training data.

TABLE 1

Training data

| File Size | Access Model | Access Permission | Owner | Label (R + W)/2 |
|---|---|---|---|---|
| 5K | Read-only | 0777 | Root | DFS1 |
| 50K | Read-only | 0777 | User1 | DFS2 |
| 500K | Read-only | 0777 | User2 | DFS3 |
| 5M | Write-only | 0777 | User1 | DFS1 |
| 5M | Write-only | 077 | User2 | DFS1 |
| 5M | Read-write | 0777 | Root | DFS2 |
| 10M | Exec | 0777 | User1 | DFS3 |

An example of a simplified decision tree construction process is given below with reference to FIGS. 3A to 3E.

Figure 3:
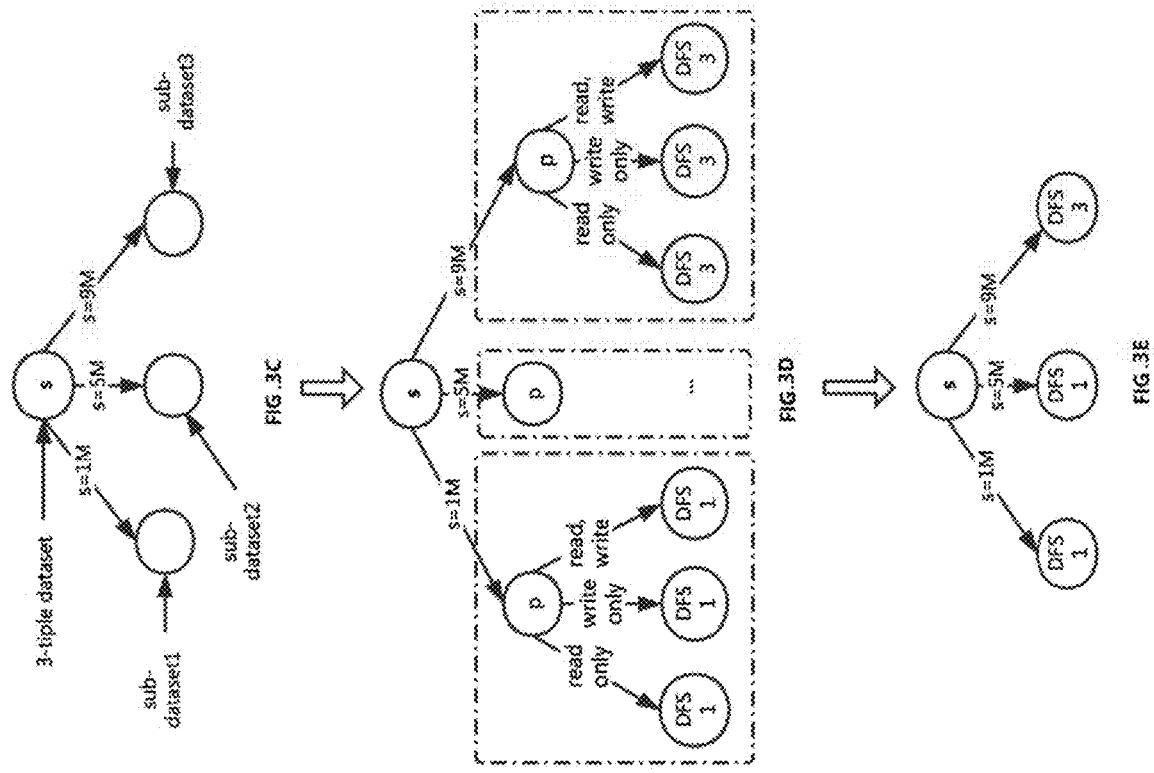
FIGS. 3A to 3E show schematic diagrams of an exemplary process of constructing an intelligent storage policy decision tree.

In the example of FIGS. 3A to 3E, a simplified training data form is used, to acquire a 3-tiple dataset including size, permission, and target DFS; each sample includes features such as size, permission, and target DFS; and the training dataset is as shown in FIG. 3A.

Then, on a principle of maximum information entropy, a size that has greatest impact on classification is selected as a classification node to construct the decision tree in FIG. 3C, and the training data is divided into m groups according to the size (the file sizes are divided into m categories) based on the decision tree, m is an integer greater than or equal to 2; in the example, m=3, so in FIG. 3B, the data is divided into 3 groups, respectively, 1M, 5M and 9M in FIG. 3B, which are further divided into 3 branches as shown in FIG. 3D with permission selected as a classification node, on the principle of maximum information entropy again. At this time, all data has been classified. Finally, part of leaf nodes are combined and constructed to obtain FIG. 3E, and thus the decision tree is constructed.

In one example, optimization processing including pruning and cross-validation, etc. is performed in construction of the decision tree model.

It should be noted that, in the disclosure, as the artificial intelligence learning algorithm for determining the distributed file system in which the file should be stored according to the file attributes, the decision tree is provided as a preferred example, not as a limitation; on the contrary, other artificial intelligence learning algorithm may also be selected, for example, a deep neural network, a support vector machine, nearest neighbor learning, etc.

File operations on the file system include initial storage operation (write operation), and subsequent read and possible update operations.

Figure 4:
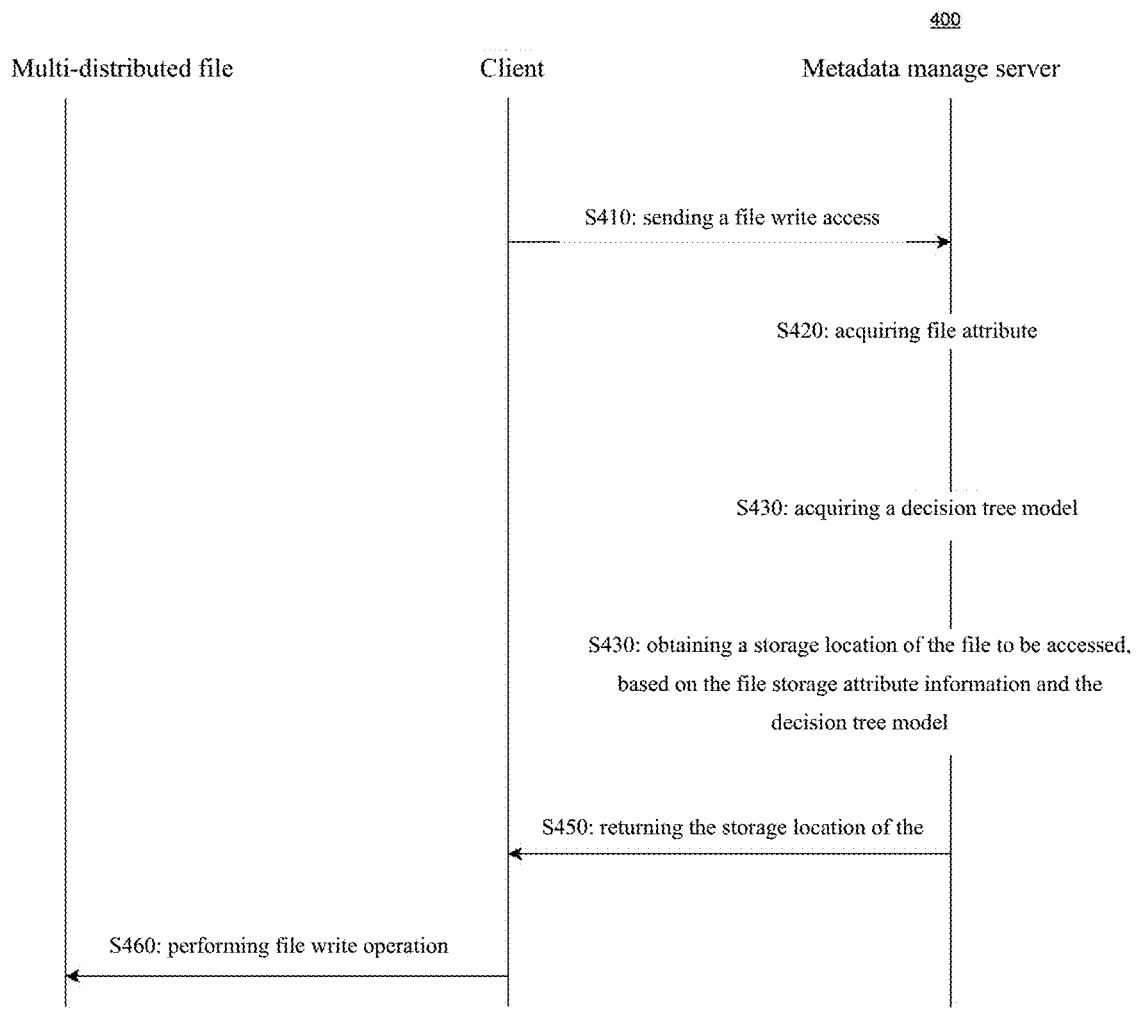
FIG. 4 shows a sequence chart of writing a file in a hybrid file system architecture according to an embodiment of the present disclosure.

FIG. 4 shows a sequence chart of writing a file in a hybrid file system architecture according to an embodiment of the present disclosure.

As shown in FIG. 4, in step S410, a client sends a file write access request to a metadata manage server.

In step S420, the metadata manage server acquires file attribute information.

In step S430, the metadata manage server acquires a decision tree model maintained by the metadata manage server.

In step S440, the metadata manage server obtains a storage location of the file to be written, based on the file storage attribute information and the decision tree model.

In step S450, the metadata manage server returns the storage location of the file to the client.

In step S460, the client communicates with a corresponding distributed file system according to the returned storage location, to perform an actual file write operation.

Figure 5:
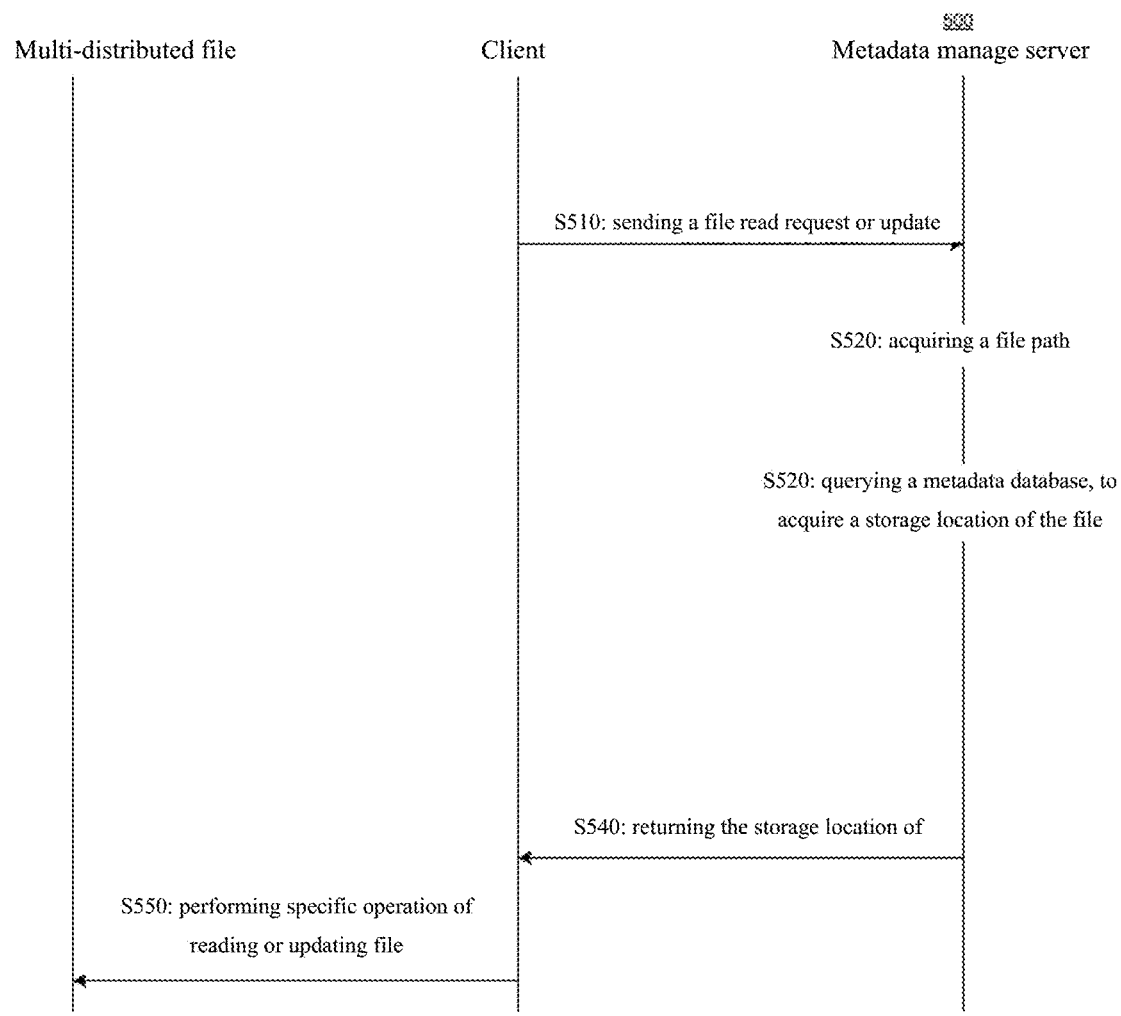
FIG. 5 shows a sequence chart of corresponding operations caused by a file read request or update request from a client after a file has been stored in a hybrid file system architecture.

FIG. 5 shows a sequence chart of corresponding operations caused by a file read request or update request from a client after a file has been stored in a hybrid file system architecture.

In step S510, the client sends a file read request or update request to a metadata manage server.

In step S520, the metadata manage server acquires a file path from the read request or the update request.

In step S530, the metadata manage server queries a metadata database, to acquire a storage location of the file to be read or updated.

In step S540, the metadata manage server feeds back the storage location of the file to the client.

In step S550, the client communicates with a corresponding distributed file system according to the returned storage location, and performs actual file read or update operations.

In the storage process, with increase of file storage, storage efficiency of storage space of some distributed file systems will decrease; in order to solve the problem, in an optional implementation mode, file migration may also be performed, that is, a file stored in one distributed file system is migrated to another distributed file system, so that storage capacity of the system may be further improved through migration, to promote load equalization between respective distributed file systems.

Figure 6:
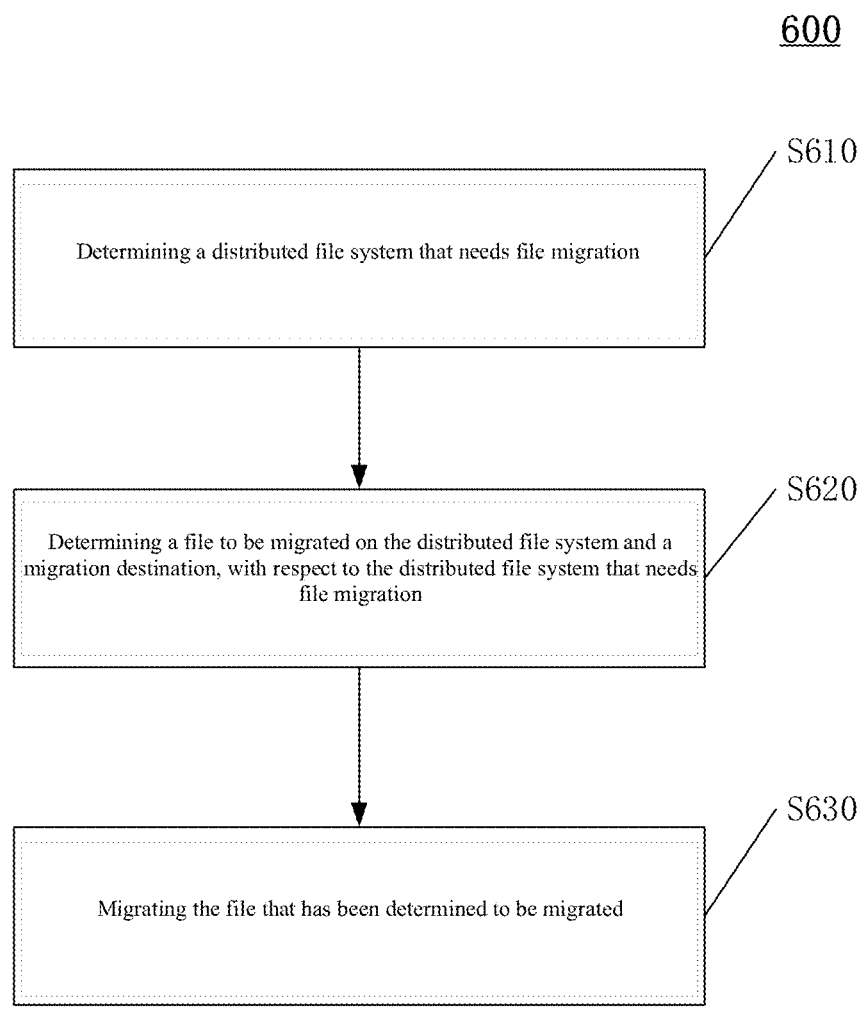
FIG. 6 shows an overall flow chart of a file dynamic migration method according to an embodiment of the present disclosure.

Hereinafter, an embodiment of a method 600 for migrating the file between distributed file systems will be described in conjunction with FIG. 6.

Step S610: determining a distributed file system that needs file migration.

In one example, it is determined every preset period whether there is a distributed file system that needs file migration.

Alternatively, usage situation of respective distributed file systems may also be continuously monitored, to judge whether file migration is needed.

Usage rates of the respective distributed file systems may be investigated, to determine a situation of load equalization, or say, usage equalization between the respective distributed file systems; and in a case where severe disequilibrium in usage rate occurs, file migration, specifically, file emigration, is performed on a distributed file system with an excessively high usage rate.

Specifically, in one example, the determining a distributed file system that needs file migration includes: calculating a difference in usage rate between any two distributed file systems; and determining that a distributed file system with a higher usage rate needs file migration, when the difference in usage rate is greater than a predetermined threshold.

For example, if a usage rate of a distributed file system A is 90% while a usage rate of a distributed file system B is only 10%, it is obvious that severe load disequilibrium occurs, then a file migration operation may be performed on the distributed file system A.

In the disclosure, a usage rate of a distributed file system represents that the file system usage rate is a ratio of actual use capacity of the file system to original capacity.

Step S620: determining a file to be migrated on the distributed file system and a migration destination, for the distributed file system that needs file migration.

In one example, the determining a file to be migrated on the distributed file system, for the distributed file system that needs file migration includes: calculating a migration gain of migrating each file in the distributed file system that needs file migration to any one of other distributed file systems; and determining the file to be migrated and the migration destination of the file based on sorting of migration gains of migrating respective files to other distributed file systems.

In one example, the calculating a migration gain of migrating each file in the distributed file system that needs file migration to any one of other distributed file systems may be performed as follows:

For convenience of description, referring to the distributed file system that needs file migration as a distributed file system i, referring to any one of the other distributed file systems as a distributed file system j, and referring to the file on the distributed file system i as a file x;

Obtaining read throughput and write throughput of the file x on the distributed file system i, and predicting read throughput and write throughput of the file x on the distributed file system j;

Obtaining a read frequency and a write frequency of the file x on the distributed file system i; and Calculating a migration gain of migrating the file x from the distributed file system i to the distributed file system j, at least based on the size of the file x, the read frequency and the write frequency of the file x on the distributed file system i, the read throughput and the write throughput of the file x on the distributed file system i, as well as the read throughput and the write throughput of the file x on the distributed file system j.

In a preferred example, the migration gain of migrating the file x from the distributed file system i to the distributed file system j is calculated based on a formula below:

$$\text{diff}_x(DFS_i, DFS_j) = (s_x/F_{xrt}(DFS_i) - s_x/F_{xrt}(DFS_j)) * F_{xrf} + (s_x/F_{xwt}(DFS_i) - s_x/F_{xwt}(DFS_j)) * F_{xwf} \quad (1)$$

$DFS_i$ and $DFS_j$ represent the distributed file systems i,j; $F_{xrt}(DFS_i)$ and $F_{xrt}(DFS_j)$ are respectively read throughput rates of the file x in the distributed file systems i,j; $F_{xwt}(DFS_i)$ and $F_{xwt}(DFS_j)$ are write throughput rates of the file x in the distributed file systems i,j; a throughput rate is a size of a file read and written per second; the read throughput rate and the write throughput rate are functions of the file size; $F_{xrf}$ and $F_{xwf}$ are respectively the read frequency and the write frequency of the file x in the distributed file system i; and $s_x$ is a size of the file x to be migrated in the file system.

In the above-described Formula (1), a first part of the summation on the right side of the equal sign represents an overall performance improvement made by migrating the file x from the distributed file system i to the distributed file system j, or say, a comprehensive migration gain in file size and read performance, in consideration of file size (a factor of file system usage rate level), read performance throughput rate, and read frequency; and a second part of the summation represents an overall performance improvement made by migrating the file x from the distributed file system i to the distributed file system j, or say, a comprehensive migration gain in file size and write performance, in consideration of file size, write performance throughput rate, and write frequency.

Formula (1) indicates that, the larger the file size, the higher the read and write frequencies, the greater the throughput rate of the file on the distributed file system j, and the higher the migration gain of migrating the file to the distributed file system j with respect to the distributed file system i.

In one example, in the above-described Formula (1), the read frequency and the write frequency of the file x in the distributed file system i may be obtained by querying the metadata manage server.

It should be noted that, Formula (1) is a preferred example of calculating a migration gain of a file, but it is not a limitation; and other calculation formulas may also be designed according to needs.

Here, the read throughput and the write throughput of the file x on the distributed file system i may be obtained by, for example, actual observation, or may also be obtained by prediction; while the read throughput and the write throughput of the file x on the distributed file system j may only be obtained by prediction.

In one example, predicting the read throughput and the write throughput of the file x on a distributed file system may be performed, for example, by using a predetermined regression model, and the regression model is selected from one of:

| Model | Regression equation |
|---|---|
| First-order model | $y(k) = a_0 + a_1 e^{-pk}$ |
| Second-order model | $y(k) = a_0 + a_1 e^{-pk} + a_2 e^{-p_2 k}$ |
| Third-order model | $y(k) = a_0 + a_1 e^{-pk}$ |
| | $\quad + b e^{-\delta w k} \cos(w\sqrt{1-\delta^2}\, k)$ |
| | $\quad + c e^{-\delta w k} \sin(w\sqrt{1-\delta^2}\, k)$ |
| Fourth-order model | $y(k) = a_0 + b_1 e^{-\delta_1 w_1 k} \cos(w_1\sqrt{1-\delta_1^2}\, k)$ |
| | $\quad + c_1 e^{-\delta_1 w_1 k} \sin(w_1\sqrt{1-\delta_1^2}\, k)$ |
| | $\quad + b_2 e^{-\delta_2 w_2 k} \cos(w_2\sqrt{1-\delta_2^2}\, k)$ |
| | $\quad + c_2 e^{-\delta_2 w_2 k} \sin(w_2\sqrt{1-\delta_2^2}\, k)$ |

Table 2 Formula Expressions of Respective Regression Models

As an example, the predetermined regression model may be determined through a fitting process and a selecting process below: inputting file training data to different types of regression model formulas; calculating unknown parameters by using a least square method; fitting to obtain the different types of regression models after the fitting; and selecting a regression model with a best fitting effect from the different types of regression models after the fitting as the predetermined regression model.

Figure 7:
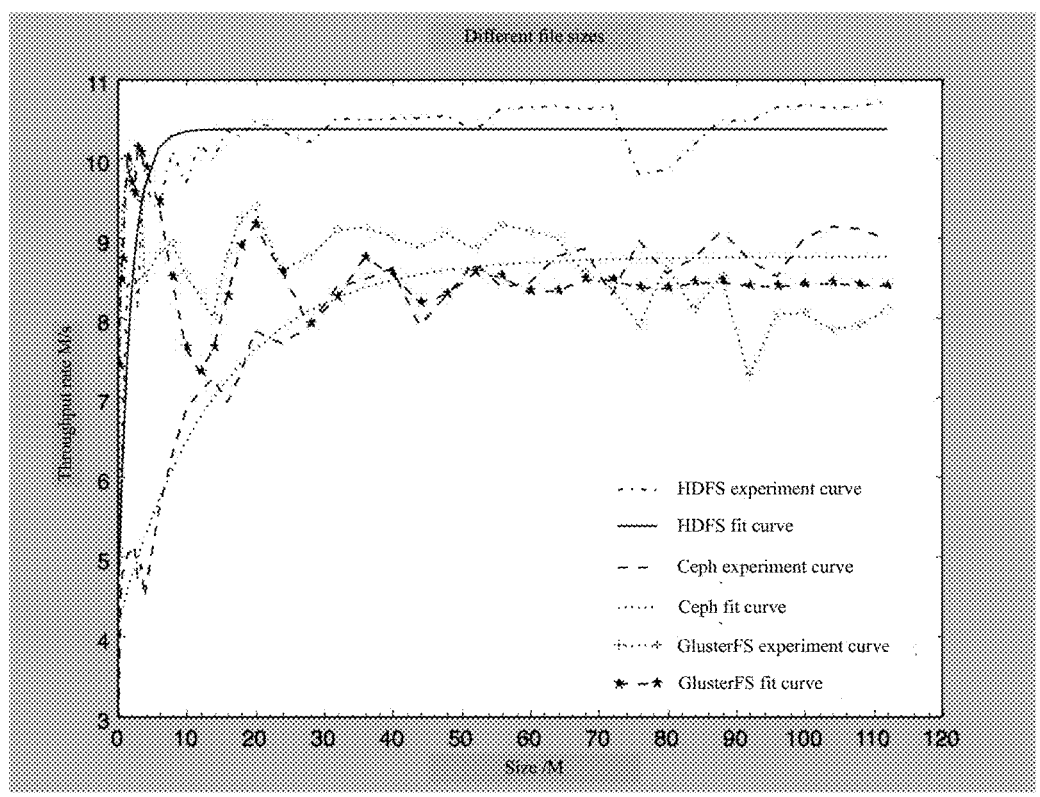
FIG. 7 shows a schematic diagram of comparison between a throughput fit curve and an actual curve of respective distributed file systems obtained through experiments according to an embodiment of the present disclosure.

FIG. 7 shows a schematic diagram of comparison between a throughput fit curve and an actual curve of respective distributed file systems obtained through experiments according to an embodiment of the present disclosure. In FIG. 7, an abscissa represents different file sizes, and an ordinate represents throughput rates.

Target distributed file systems as experimental objects are respectively Ceph, HDFS and GlusterFs. According to actual running results, the file sizes are substituted into the respective regression model formulas shown in Table 2, and an error is calculated by using a least square method; when the overall error is minimal, a curve fitting effect is optimal, wherein, read and write curves of several types of distributed file systems are fitted respectively, and it can be seen from FIG. 7 that, it is only necessary to perform first-order fitting on HDFS write with Ceph Write and Ceph Read to achieve an optimal effect, while other types require higher-order fitting.

Table 3 shows throughput rate fit curves of different distributed file systems based on experiments and fitting calculations. In Table 3, as described above, the target file systems are respectively Ceph, HDFS and GlusterFs; and it is found through experiments that, HDFS write, Ceph Write, and CephRead achieve optimal effects with only the first-order fitting, while other types require higher-order fitting.

TABLE 3

Fitting parameters of target file systems

| Curves | Fitting results |
|---|---|
| HDFS write curve | $y(k) = 10.39065 - 6.38257 e^{-0.54163k}$ |
| Ceph write curve | $y(k) = 8.79252 - 4.65085 e^{-0.06894k} y(k)$ |
| GlusterFS write curve | $y(k) = 8.43731 + 0.10894 e^{-0.04518k} \cos(-38.07854k) - 1.89347 e^{-0.04518k} \sin(-38.07854k) + 1.49443 e^{-0.61613k} \cos(33.75146k) - 0.05625 e^{-0.61613k} \sin(33.75146k)$ |
| HDFS read curve | $y(k) = 11.0027 - 49.0537 e^{-97.8321k} - 5.3826 e^{-2.9596k} \cos(25.1327k) - 42.3298 e^{-2.9596k} \sin(25.1327k)$ |
| Ceph read curve | $y(k) = 11.128770 - 1.063236 e^{-0.718258k}$ |
| GlusterFS read curve | $y(k) = -0.0433 + 0.1108 e^{0.00013k} - 6.2434 e^{-4.3548k} \cos(0.000019k) + 17.2060 e^{-4.3548k} \sin(0.000019k)$ |

Table 4 is a physical environment configuration example of a high-performance hybrid file system architecture experiment as an example; and as shown below, in order to meet architecture requirements, the physical environment of the experiment is mainly divided into one node for a client and 6 nodes for underlying storage servers, as well as one metadata manage server node, wherein, the underlying physical storage node may be expanded and hidden from the client, and all node operating systems are ubuntu14.04, with 1T capacity.

TABLE 4

Physical environment for experiment

| Node number | File system | Host name | Usage | Notes |
|---|---|---|---|---|
| Node 1 | MMS | Master | Metadata management | 1TB capacity |
| Node 2 | HDFS | HDFS1 | Name node | 1TB capacity |
| Node 3 | HDFS | HDFS2 | Datanode | 1TB capacity |
| Node 4 | Ceph | Ceph1 | mds,mon,osd | 1TB capacity |
| Node 5 | Ceph | Ceph2 | osd | 1TB capacity |
| Node 6 | GlusterFS | GlusterF S1 | Glsuterfs server1 | 1TB capacity |
| Node 7 | GlusterFS | GlusterF S2 | Glsuterfs server2 | 1TB capacity |
| Node 8 | Client | Client | Client | 1TB capacity |

By using the curve of relationship between the throughput rate of the respective distributed file systems and the file size obtained by fitting in this way, throughput rates of the file on different distributed file systems may be predicted, in a case where file sizes of different files are known.

After migration gains are sorted, a file to be migrated may be determined; the migration gain is an expected gain of migrating the file from the file system where it is located to a certain distributed file system, and thus, a destination distributed file system to which the file is to be migrated is also determined.

Step S630: migrating the file that has been determined to be migrated.

For the respective files sorted according to the migration gains, file migration can be performed in order from a file with a largest migration gain, until a usage rate difference between file systems meets requirements, and the migration is complete. The migration process is a C-D process, that is, copying and then deleting, wherein, mandatory locks are added in a file operation process.

A pseudo code example that implements the dynamic migration process is given below.

---
Algorithm 1
The Dynamic File Migration Function
---

Input: $p_0$, DFSs
Output: null
```
 1:     for i = 0 to DFSs.size( ) do
 2:        for j = i to DFSs.size( ) do
 3:           if (DFSs[i].usage – DFSs[j]usage.) > p0 then
 4:              originalLoc = i
 3:              destinationLoc = j
 6:              stop
 7:           end if
 8:        end for
 9:     end for
10:     if i = j then
11:        return null
12:     end if
13:     files[ ] = DFSs[originalLoc].files
14:     Throuhput [ ] = CalculateThrouhputDegrade (files[ ]
            DFSs[originalLoc],DFSs[destinationLoc])
15:     migrateList[ ] = sort(Throuhput [ ])
16:     for i = 0 to migrateList.size( ) do
17         data = readFilesmigrateList[i], DF'Ss[originalLoc])
18:        writeFile(data,DFSs[destinationLoc])
19:        deleteFile(migrateList[i], DFSs[originalLoc])
20         if (DFSs[orig].usage – DFS[des].usage ) < p0 then
21            return null
22         end if
23:     end for
```

In the above-described pseudo code, a first "for" loop is to determine a difference in usage rate between any two file systems; when there is a difference in usage rate between two file systems that is greater than p0, that is, when load disequilibrium occurs to the file system architecture, a migration procedure is enabled; line 14 is to calculate a migration degree of all files of a file system that needs migration and other file systems; and line 15 is to sort according to the calculated migration degree. Lines 16 to 23 are to migrate: firstly copy the file to the target file system, and then delete the file from the original file system, until the difference in usage rate between file systems meets conditions.

Through the experiments, it is validated that, for the hybrid file system, dynamic file migration may be performed to achieve usage equalization of the different file systems, and better comprehensive performances that ensures better read and write performance throughput rates.

According to another embodiment of the present disclosure, there is provided a file storage processing system, comprising a memory and a processor, the memory having computer-executable instructions stored thereon, and when executed by a controller, the computer-executable instructions being operable to execute the above-described file storage processing method.

According to another embodiment of the present disclosure, there is provided a file migration processing system, comprising a memory and a processor, the memory having computer-executable instructions stored thereon, and when executed by a controller, the computer-executable instructions being operable to execute the above-described file dynamic migration method.

According to another embodiment of the present disclosure, there is provided a computer-readable storage medium, having computer-executable instructions stored thereon, and when executed by a computing device, the computer-executable instructions being operable to execute the above-described file storage processing method.

According to another embodiment of the present disclosure, there is provided a computer-readable storage medium, having computer-executable instructions stored thereon, and when executed by a computing device, the computer-executable instructions being operable to execute the above-described file dynamic migration method.

According to another embodiment of the present disclosure, there is provided a metadata manage server in a hybrid file system architecture system, which interacts with a client and a plurality of distributed file systems, the metadata manage server maintaining a pre-configured storage rule below, and being configured to perform a method below: acquiring storage attributes of a file to be stored, wherein, the storage attributes at least include a size of the file; determining, according to a pre-configured storage rule and the attributes of the file to be stored, in which distributed file system the file to be stored is stored; determining a distributed file system that needs file migration; determining a file to be migrated on the distributed file system and a migration destination, for the distributed file system that needs file migration; and migrating the file that has been determined to be migrated.

According to another embodiment of the present disclosure, there is provided a hybrid file system architecture system, comprising the above-described metadata manage server and a plurality of different types of distributed file systems.

There may be one or more of the above-described processors, which may be concentrated on one physical address or distributed on a plurality of physical addresses. Each of the one or more processors may be a device that can execute machine-readable and executable instructions, for example, a computer, a microprocessor, a microcontroller, an integrated circuit, a microchip, or any other computing device. The one or more processors may be coupled to a communication path that provides signal interconnection between different devices, components and/or modules. The communication path may cause any number of processors to be communicatively coupled to each other, and may allow modules coupled to the communication path to operate in a distributed computing environment. Specifically, each module may be operated as a node that can send and/or receive data. In addition, "being communicatively coupled" refers to that mutually coupled components may exchange data with each other, for example, in a form of electrical signals, electromagnetic signals, and optical signals.

In addition, the above-described memory may include one or more memory modules. The memory module may be configured to include a volatile memory, for example, a Static Random Access Memory (S-RAM) and a Dynamic Random Access Memory (D-RAM), as well as a non-volatile memory, for example, a flash memory, a Read-Only Memory (ROM), an Erasable Programmable Read-Only Memory (EPROM) and an Electrically Erasable Programmable Read-Only Memory (EEPROM). In the memory module, any form of machine-readable and executable instruction is stored for accessing by a processor. The machine-readable and executable instructions may be logics or algorithms written in any programming language, for example, a machine language that can be directly executed by a processor, or an assembly language that can be compiled or assembled into machine-readable instructions and stored in the memory module, an Object-Oriented Programming (OOP) language, Javascript language, a microcode, etc. Alternatively, the machine-readable and executable instructions may also be written in a hardware description language, for example, logics implemented by a Field Programmable Gate Array (FPGA) or an Application Specific Integrated Circuit (ASIC), etc.

The high-performance hybrid file system architecture structure, the file storage processing method, the file dynamic migration method and the metadata manage server according to the embodiments of the present disclosure, make comprehensive use of the performance advantages of a variety of distributed file systems to process various file storage problems, which, committed to improving a universal high-performance file system, can cope with storage problems of files of various types under various complex environments, and all have high performance.

It should be understood by those skilled in the art that the embodiments of the present disclosure as described above and shown in the drawings are only examples and do not limit the present disclosure. The objective of the present disclosure has been fully and effectively achieved. The functional and structural principles of the present disclosure have been shown and described in the embodiments; and any transformation or modification may be made to the implementing modes of the present disclosure without departing from the principles.

The invention claimed is:

1. A file storage processing method applied in a hybrid file system architecture including a plurality of different types of distributed file systems, for determining in which distributed file system a file to be stored is stored, the file storage processing method comprising:
acquiring storage attributes of the file to be stored, wherein, the storage attributes at least include a size of the file;
determining, according to a pre-configured storage rule and the storage attributes of the file to be stored, in which distributed file system the file to be stored is stored; and
storing the file to be stored in the determined distributed file system;
wherein, the pre-configured storage rule is an intelligent storage model, and the method further comprises learning by using an artificial intelligence learning algorithm based on a training sample set to obtain the pre-configured storage rule;
wherein features of each training sample of the training sample set include storage attributes of a file and a label of the file system to which the file has been determined to be assigned; and
wherein, the label of the file system to which the file has been determined to be assigned is determined by the file storage processing method based on I/O performance of the file on each of the distributed file systems, and the I/O performance of the file on each of the distributed file systems is determined experimentally as follows:
acquiring a read throughput rate $F_{irt}$ and a write throughput rate $F_{iwt}$ of the file on each distributed file system through experiments, the read throughput rate $F_{irt}$ being a data size of the file read per second, and the write throughput rate $F_{iwt}$ being a data size of the file written per second; and
calculating a sum of the read throughput rate $F_{irt}$ and the write throughput rate $F_{iwt}$ of the file in each distributed file system as the I/O performance of the file on each of the distributed file systems.

2. The file storage processing method according to claim 1, wherein, the storage attributes of the file further include:
access mode, access permission, and associated users of the file;
wherein the access mode is selected from one of: read-only, write-only, read-write, and executable.

3. The file storage processing method according to claim 1, the hybrid file system architecture including a metadata manage server,
wherein, the storage rule is stored in a non-volatile storage medium, and meanwhile maintained in a metadata manage server memory; and
the storage rule is dynamically updated,
wherein, the determining, according to a pre-configured storage rule and the attributes of the file to be stored, in which distributed file system the file to be stored is stored includes: reading the storage rule from the metadata manage server, and determining, according the read storage rule and the attributes of the file to be stored, in which distributed file system the file to be stored is stored.

4. The file storage processing method according to claim 3, wherein, the storage rule is further maintained in a remote standby node.

5. The file storage processing method according to claim 1, wherein, the artificial intelligence learning algorithm is a decision tree, and the intelligent storage model is a decision tree model constructed based on training data.

6. The file storage processing method according to claim 5, wherein, optimization processing including pruning and cross-validation is performed in construction of the decision tree model.

7. The file storage processing method according to claim 5, further comprising:
receiving, by the metadata manage server, from a client a request to read a file from the hybrid file system architecture or update a file therein;
acquiring, by the metadata manage server, path information of the file to be read or updated, to further obtain storage location information of the file;
returning, by the metadata manage server, the storage location of the file to be read or updated to the client; and
communicating, by the client, with a corresponding distributed file system according to the returned storage location, to perform actual read operation or update operation.

8. The file storage processing method according to claim 1, further comprising:
determining a distributed file system that needs file migration;
determining a file to be migrated on the distributed file system and a migration destination, for the distributed file system that needs file migration; and
migrating the file that has been determined to be migrated.

9. The file storage processing method according to claim 8, wherein, the determining a distributed file system that needs file migration includes:
calculating a difference in usage rate between any two distributed file systems; and
determining that a distributed file system with a higher usage rate needs file migration, when the difference in usage rate is greater than a predetermined threshold.

10. The file storage processing method according to claim 8, wherein, the determining a file to be migrated on the distributed file system, for the distributed file system that needs file migration includes:

calculating a migration gain of migrating each file in the distributed file system that needs file migration to any one of other distributed file systems; and determining the file to be migrated and the migration destination of the file based on sorting of migration gains of migrating respective files to other distributed file systems.

11. The file storage processing method according to claim 10, wherein, the calculating a migration gain of migrating each file in the distributed file system that needs file migration to any one of other distributed file systems includes:

referring to the distributed file system that needs file migration as a distributed file system i, referring to any one of the other distributed file systems as a distributed file system j, and referring to a file on the distributed file system i as a file x;

obtaining read throughput and write throughput of the file x on the distributed file system i, and predicting read throughput and write throughput of the file x on the distributed file system j;

obtaining a read frequency and a write frequency of the file x on the distributed file system i; and calculating a migration gain of migrating the file x from the distributed file system i to the distributed file system j, at least based on the size of the file x, the read frequency and the write frequency of the file x on the distributed file system i, the read throughput and the write throughput of the file x on the distributed file system i, as well as the read throughput and the write throughput of the file x on the distributed file system j.

12. The file storage processing method according to claim 11, wherein, the migration gain of migrating the file x from the distributed file system i to the distributed file system j is calculated based on a formula below:

$$\text{diff}_x(DFS_i, DFS_j) = (s_x/F_{xrt}(DFS_i) - s_x/F_{xrt}(DFS_j)) * F_{xrf} + (s_x/F_{xwt}(DFS_i) - s_x/F_{xwt}(DFS_j)) * F_{xwf} \quad (1)$$

$DFS_i$ and $DFS_j$ represent the distributed file systems i,j; $F_{xrt}(DFS_i)$ and $F_{xrt}(DFS_j)$ are respectively read throughput rates of the file x in the distributed file systems i,j; $F_{xwt}(DFS_i)$ and $F_{xwt}(DFS_j)$ are write throughput rates of the file x in the distributed file systems i,j; a throughput rate is a size of a file read and written per second; the read throughput rate and the write throughput rate are functions of the file size; $F_{xrf}$ and $F_{xwf}$ are respectively the read frequency and the write frequency of the file x in the distributed file system i; and $s_x$ is a size of the file x to be migrated in the file system.

13. The file storage processing method according to claim 11, wherein, the predicting read throughput and write throughput of the file x on the distributed file system j includes:

predicting by using a predetermined regression model;

the predetermined regression model is determined through a fitting process and a selecting process below:

inputting file training data to different types of regression models;

calculating unknown parameters by using a least square method;

fitting to obtain the different types of regression models after the fitting; and selecting a regression model with a best fitting effect from the different types of regression models after the fitting as the predetermined regression model.

14. The file storage processing method according to claim 11, wherein, the obtaining a read frequency and a write frequency of the file x on the distributed file system i includes:

obtaining the read frequency and the write frequency of the file x on the distributed file system i by querying the metadata manage server.

\* \* \* \* \*